_United States Patent Office_

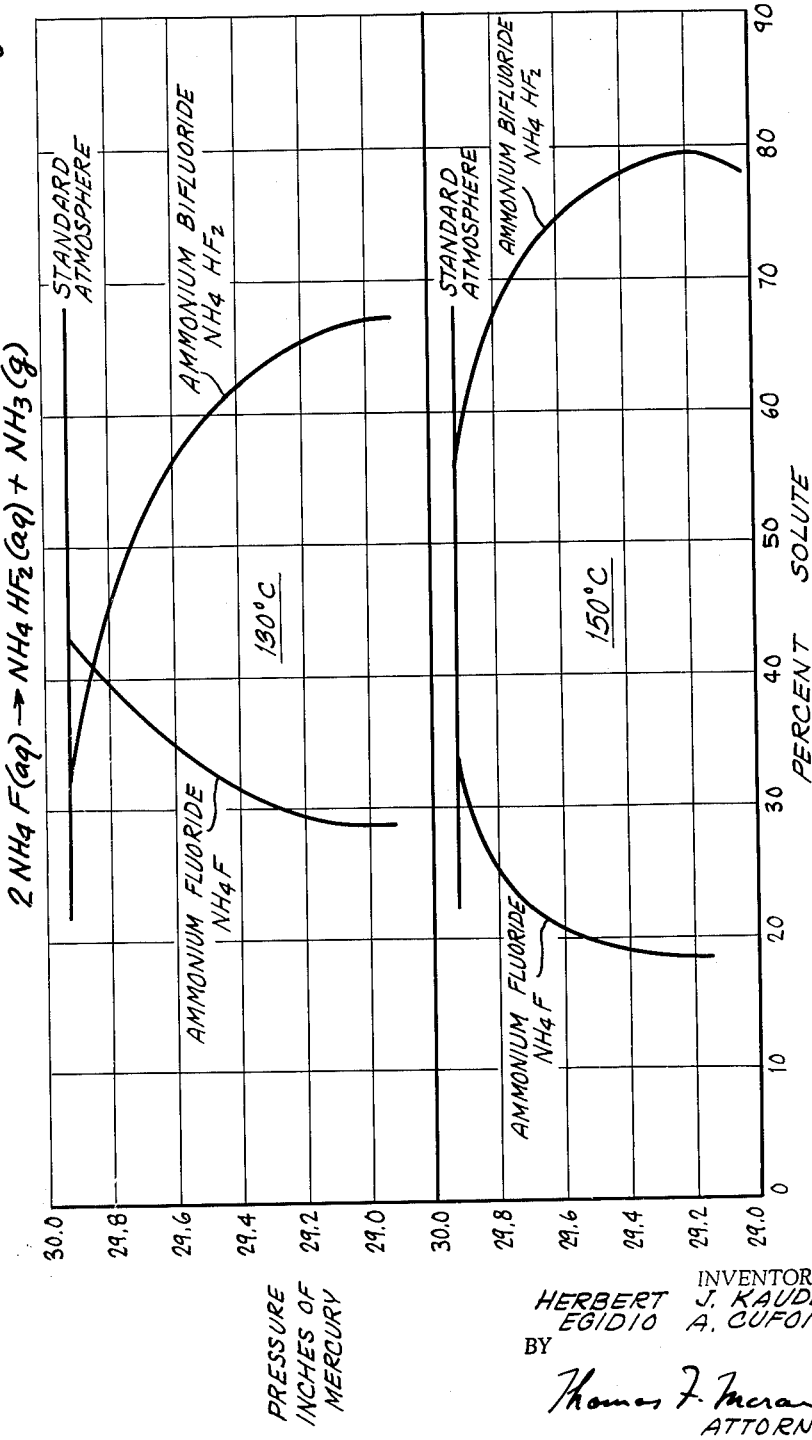

3,212,849
Patented Oct. 19, 1965

3,212,849
CONVERSION OF AMMONIUM FLUORIDE TO AMMONIUM BIFLUORIDE BY SUBATMOSPHERIC EVAPORATION OF AN AQUEOUS SOLUTION OF AMMONIUM FLUORIDE
Herbert J. Kauders, Euclid, Ohio, and Egidio A. Cufone, Jersey City, N.J., assignors, by mesne assignments, to American Agricultural Chemical Company, a corporation of Delaware
Filed June 18, 1963, Ser. No. 288,783
9 Claims. (Cl. 23—88)

This invention relates to a process for converting an aqueous solution of ammonium fluoride to ammonium bifluoride. More particularly it relates to an improvement in the process of converting ammonium fluoride in an aqueous solution to ammonium bifluoride by concentrating the aqueous solution through evaporation.

It is known that on evaporating at atmospheric pressure an aqueous solution of ammonium fluoride, ammonia is produced and escapes in the vapor phase at a higher rate than hydrogen fluoride. In other words, the mole ratio of $NH_3:HF$ in the vapor phase is greater than in the liquid phase. The conversion of ammonium fluoride to ammonium bifluoride upon heating an aqueous solution of ammonium fluoride proceeds as indicated by the following chemical equation:

$$2NH_4F \rightarrow NH_4HF_2 + NH_3 \uparrow$$
(aq. sol.) (aq. sol.) gas

It has been found that the yield of ammonium bifluoride recoverable by evaporating or concentrating an aqueous solution of ammonium fluoride may be increased substantially by carrying out the evaporation or concentration operation at a pressure slightly below atmospheric pressure. The reduction in pressure during the evaporation operation in accordance with this invention does not exceed 2" of mercury, or approximately 68 millibars, below atmospheric pressure.

Accordingly it is a primary object of this invention to provide an improved method for converting ammonium fluoride in an aqueous solution to ammonium bifluoride.

How this and other objects of this invention are achieved will become apparent in view of the accompanying disclosure and drawing which graphically illustrates the benefits obtainable in the practice of this invention.

It has been found that as the concentration of an aqueous ammonium fluoride solution progresses, with resulting conversion of the ammonium fluoride to ammonium bifluoride, there comes a point where the partial pressure of hydrogen fluoride in the ammoniacal vapors resulting from the concentration operation becomes appreciable. For this reason it is impractical to carry the conversion of the ammonium fluoride to ammonium bifluoride to completion. Therefore in the practice of the invention the concentration operation is continued until an appreciable or undesirable concentration of hydrogen fluoride appears in a vapor phase. At this point the concentrated residue is substantially dry or contains a small amount of water and the concentration or conversion operation is terminated.

In accordance with one embodiment of the practice of this invention, a solution of ammonium fluoride, e.g., a 45% solution, is heated in a suitable vessel. The solution is heated to a temperature at which a substantial amount of the ammonium fluoride in the solution is converted to ammonium bifluoride. The conversion temperature is less than 165° C. and generally within the range of from 85 to 165° C. When the desired temperature conversion level is reached, the pressure within the vessel is reduced below atmospheric pressure, the reduction in pressure not exceeding 2" of mercury. Upon continued heating the concentration proceeds and the salts involved in the thermal decomposition continue to be retained in solution by progressively lesser quantities of constituent water. The heating is carried out until the partial pressure of the hydrogen fluoride in the vapor phase becomes appreciable and the fluoride component as hydrogen fluoride is released to the vapor phase in a undesirably large amount. Heating is then discontinued and the concentrated ammonium bifluoride containing residue removed, and the ammonium bifluoride recovered by suitable means such as by recrystallization.

Referring now to the drawing there is graphically illustrated therein the improved yields of ammonium bifluoride obtainable by effecting a reduction in pressure during concentrations of boiling aqueous solutions saturated with ammonium fluoride and ammonium bifluoride.

The following is illustrative of the practice of this invention. A 45% solution of ammonium fluoride in water was placed in a closed vessel provided with a suitable means for drawing off the released vapors. This solution was then heated to 130° C. and a negative pressure differential applied. At 130° C. and at a subatmospheric pressure of 0.5 inch of mercury below atmospheric the boiling point composition of the solution was as follows:

| Component: | Percent by wt. |
|---|---|
| $NH_4HF_2$ | 62 |
| $NH_4F$ | 32 |
| $H_2O$ | 6 |

With other conditions remaining the same and at a subatmospheric pressure of 1.0 inch Hg below atmospheric pressure, the 130° C. boiling point composition of the solution was found to be:

| Component: | Percent by wt. |
|---|---|
| $NH_4HF_2$ | 68 |
| $NH_4F$ | 29 |
| $H_2O$ | 3 |

It has been found that at a concentrating or boiling temperature of 130° C. less than optimum results are obtainable when the pressure is reduced by more than 1" below atmospheric pressure. Under the latter conditions appreciable concentrations of fluoride as hydrogen fluoride, appeared in the vapor phase and correspondingly the yield of ammonium bifluoride in the concentrated residue is reduced.

The ammonium bifluoride may be separated from the ammonium fluoride by dissolving the concentrated residue in water at 85° C. The solution may then be cooled to a lower temperature causing most of the ammonium bifluoride to crystallize out of solution. These crystals may be separated from the solution by suitable means, such as by filtration.

In accordance with another embodiment of the invention, a 45% solution was heated to 150° C. under conditions otherwise the same as described hereinabove. Under these conditions the boiling point composition of concentrated solutions for (1) atmospheric pressure and at subatmospheric pressures of (2) 0.5 and (3) 0.75 inch of mercury below atmospheric pressure, respectively, are set forth in accompanying Table I.

Table I

|  | (1) Atmospheric, percent by wt. | (2) −0.5 in Hg below atmos., percent by wt. | (3) −0.75 in Hg below atmos., percent by wt. |
|---|---|---|---|
| $NH_4HF_2$ | 55.0 | 78.0 | 79.5 |
| $NH_4F$ | 34.0 | 19.0 | 19.0 |
| $H_2O$ | 11.0 | 3.0 | 1.5 |

Where the solution was heated to 150° C. it was found that undesirable results, i.e., appreciable concentrations of hydrogen fluoride in the vapor phase, were obtained when the pressure in the vessel was reduced to more than ¾ of an inch of mercury below atmospheric pressure.

The drawing graphically illustrates the effect of pressure on solute concentrations in boiling aqueous solutions saturated with ammonium fluoride and ammonium bifluoride (a) at 130° C. and (b) at 150° C. As may readily be seen by examination of the 130° C. curve of the drawing the increase in concentration of ammonium bifluoride is substantial as the pressure is reduced from atmospheric pressure to approximately one inch below atmospheric pressure. Further reduction in pressure has little effect on the conversion of ammonium bifluoride. Examination of the 150° C. curve indicates that the percentage concentration of ammonium bifluoride increases substantially as the pressure is reduced from atmospheric pressure to a pressure of −0.5 below atmospheric pressure. As the pressure is further reduced, the percentage concentration of ammonium bifluoride begins to decrease.

On the practice of this invention the initial concentration of the ammonium fluoride solution is not critical and the invention may be applied to an aqueous ammonium fluoride solution of substantially any concentration. Also, it is to be understood that the practice of the invention may be carried out at any suitable temperature, preferably less than 165° C. The process of the invention is particularly effective where the concentrating temperature is within the range of from 85° C. to 165° C. Also, the optimum subatmospheric pressure varies depending on the concentration temperature. Accordingingly the subatmospheric pressure employed should be such that for the concentration temperature employed, the maximum yield of ammonium bifluoride is obtained in the concentrated residue.

While we have shown and described certain preferred embodiments of our invention, other modifications will readily occur to those skilled in the art, and we therefore intend our invention to be limited only by the appended claims.

We claim:

1. In a method wherein an aqueous solution consisting essentially of ammonium fluoride dissolved therein is evaporated at an elevated temperature effective to convert ammonium fluoride in said solution to ammonium bifluoride, the improvement which comprises carrying out the evaporation of said aqueous ammonium fluoride solution at a temperature in the range 85–165° C. and at a subatmospheric pressure from about 0.5″ Hg to not more than about 2″ Hg below atmospheric pressure.

2. In a method wherein an aqueous solution consisting essentially of ammonium fluoride dissolved therein is concentrated by evaporation at a temperature effective to convert a substantial amount of the ammonium fluoride in said solution to ammonium bifluoride, the improvement which comprises carrying out said concentration operation at a temperature not greater than 165° C. and at a subatmospheric pressure from about 0.5″ Hg to not more than 2″ Hg below atmospheric pressure.

3. A method in accordance with claim 2 wherein said temperature is 130° C. and wherein said concentration operation is carried out at a subatmospheric pressure not more than about 1″ Hg below atmospheric.

4. A method in accordance with claim 2 wherein said temperature is 150° C. and wherein said concentration operation is caried out at a subatmospheric pressure not more than about 0.75″ Hg below atmospheric.

5. A method of converting ammonium fluoride to ammonium bifluoride which comprises forming an aqueous solution consisting essentially of ammonium fluoride dissolved therein, concentrating said aqueous solution by evaporation at an elevated temperature not greater than 165° C. and at a subatmospheric pressure from about 0.5″ Hg to not more than 2″ Hg below atmospheric, said concentration operation being carried out to substantial dryness, and recovering the resulting concentrated residue containing ammonium bifluoride.

6. A method in accordance with claim 5 wherein ammonium bifluoride is recovered from said concentrated residue by recrystallization.

7. A method in accordance with claim 5 wherein said concentration operation is carried out to a moisture content in said residue below about 10% by weight.

8. A method of converting ammonium fluoride to ammonium bifluoride which comprises providing an aqueous solution consisting essentially of ammonium fluoride dissolved therein, concentrating said aqueous solution by evaporation at a temperature not greater than about 165° C. effective to convert ammonium fluoride to ammonium bifluoride and at a subatmospheric pressure from about 0.5″ Hg to not more than 2″ Hg below atmospheric, said concentration operation being carried out until solid, undissolved ammonium bifluoride begins to appear on the resulting concentrated residue and recovering ammonium bifluoride as product from said residue.

9. A method of converting ammonium fluoride to ammonium bifluoride which comprises providing an aqueous solution consisting essentially of ammonium fluoride dissolved therein, concentrating said aqueous solution by evaporation at a temperature not greater than about 165° C. effective to convert ammonium fluoride to ammonium bifluoride and at a subatmospheric pressure from about 0.5″ Hg to not more than 2″ Hg below atmospheric, said concentration operation being carried out until a substantial portion of hydrogen fluoride appears in a vapor generated during said concentration operation.

References Cited by the Examiner

UNITED STATES PATENTS

| | | | |
|---|---|---|---|
| 2,446,484 | 8/48 | McClenahan | 23—88 |
| 2,780,522 | 2/57 | Gloss | 23—88 |
| 3,005,684 | 10/61 | Riedl et al. | 23—88 |
| 3,021,194 | 2/62 | Cunningham | 23—88 |
| 3,089,752 | 5/63 | Clark | 23—88 |
| 3,106,449 | 10/63 | Fitch | 23—88 |

MAURICE A. BRINDISI, *Primary Examiner.*